United States Patent [19]

Brown et al.

[11] Patent Number: 5,206,860
[45] Date of Patent: Apr. 27, 1993

[54] RECOVERY FROM A POSSIBLE SWITCHING ERROR IN A COMPUTER I/O SYSTEM

[75] Inventors: Paul J. Brown, Poughkeepsie, N.Y.; Matthew J. Kalos, Tucson, Ariz.; Martin W. Sachs, Westport, Conn.

[73] Assignee: International Business Machines Corporation, Armonk, N.Y.

[21] Appl. No.: 576,302

[22] Filed: Aug. 31, 1990

[51] Int. Cl.$^5$ .............................................. G06F 11/00
[52] U.S. Cl. ................................... 371/20.1; 371/20.2; 371/7; 395/575
[58] Field of Search .......................... 371/20.1, 7, 11.2; 395/575

[56] References Cited

U.S. PATENT DOCUMENTS

| | | | |
|---|---|---|---|
| 4,413,335 | 11/1983 | Clements et al. | 370/16 |
| 4,605,928 | 8/1986 | Georgiou | 340/825.94 |
| 4,630,045 | 12/1986 | Georgiou | 340/825.79 |
| 4,648,031 | 3/1987 | Jenner | 364/200 |
| 4,665,520 | 5/1987 | Strom et al. | 371/7 |
| 5,081,624 | 1/1992 | Beukema | 371/8.2 |

FOREIGN PATENT DOCUMENTS 2194867 3/1988 United Kingdom .

OTHER PUBLICATIONS

Computer Networks and ISDN Systems 12 (1986), vol. 12, No. 5, pp. 291-310 by W. S. Lai, "An Analysis of the Integrity of Data Delivery in Computer Networks".
IBM Technical Disclosure Bulletin, vol. 14, No. 7, Dec. 1971, pp. 2233-2235, Rommelfanger, "A Communications Controller Command Set".
IBM Technical Disclosure Bulletin, vol. 14, No. 8, Jan. 1972, p. 2284, "Use of Command Retry Function to Free Channel Interface".
IBM Technical Disclosure Bulletin, vol. 25, No. 6, Nov. 1982, p. 2840, Sheldon et al., "Protocol for Wrap Operation on Duplex Loop Communication System".

Primary Examiner—Robert W. Beausoliel, Jr.
Assistant Examiner—Ly V. Hua
Attorney, Agent, or Firm—Floyd A. Gonzalez

[57] ABSTRACT

A connection recovery apparatus for placing a dynamic connection of a dynamic switch of a computer I/O system in a known state upon the detection of a possible switching error. The I/O system includes transmitting stations each having a link-level facility attached by a link to a dynamic-switch port of a dynamic-switch. The dynamic-switch makes dynamic connections between any two of the stations. Upon the detection of a possible switching error, the detecting link-level facility of a station or its attached dynamic-switch port starts a switch recovery procedure which places any dynamic connection to that station in a known disconnected state.

11 Claims, 3 Drawing Sheets

RECOVERY FROM A POSSIBLE SWITCHING ERROR IN A COMPUTER I/O SYSTEM

BACKGROUND OF THE INVENTION

The present invention is related to a dynamic switch between channels and control units in a computer input/output (I/O) system, and is more particularly related to recovery of a switch connection from a possible switching error such as when the status of a connection between ports of the dynamic switch becomes uncertain.

Switches and various retry and control functions are known in the prior art. "A Communications Controller Command Set" by A. C. Rommelfanger, IBM Technical Disclosure Bulletin Vol. 14, No. 7, December 1971, pages 2233–2235, discloses making a communication controller command set independent of whether the terminal is on a switched or a non-switched line and supporting both interactive exchanges and message switching in the same network while the communications controller is shared by multiple systems. A disconnect command is used for normal termination of a session. A reset command assumes a known physical connection state.

"Use of Command Retry Function to Free Channel Interface" by M. I. Schor, IBM Technical Disclosure Bulletin Vol. 14, No. 8, January 1972, page 2284, discloses the use of a channel command retry function to enable a control unit to disconnect from the channel after receiving a command but before executing it. Described is a normal situation in which there is a known connection state but in which the control unit is not ready to proceed with the operation.

"Protocol for Wrap Operation on Duplex Loop Communication System" by R. J. Sheldon et al, IBM Technical Disclosure Bulletin Vol. 25, No. 6, November 1972, page 2840, discloses an exchange of messages which confirms that the system has been restored to a specified state. In the subject disclosure, the messages are an integral part of the process of restoration.

U.S. Pat. No. 4,648,031 issued Mar. 3, 1987 to Jenner for "Method and Apparatus for Restarting a Computing System" discloses the use of a recovery log for restarting a computer system and its interrupted units of work, and rebuilding the data base, following a normal or abnormal termination.

U.S. Pat. No. 4,665,520 issued May 12, 1987 to Strom et al for "Optimistic Recovery in a Distributed Processing System" discloses enabling a fault tolerant distributed system to recover from failures in spite of the loss of messages. The disclosed technique reduces the processing costs of maintaining the information which is essential to recovery. The status of the various processes are checkpointed and dependencies of messages on earlier messages are tracked.

SUMMARY OF THE INVENTION

The present invention is used in an I/O system having a dynamic switch between one or more channels and one or more control units. If the status of a connection between a channel and a control unit through the dynamic switch becomes uncertain, a connection may be attempted in the belief that a previous connection was broken, or a connection which is believed to exist may in fact not exist, or the connection may be between one set of switch ports when it is believed to be between a different set. Any of these situations may result in a connection being present which is different from the one thought to exist. The present invention provides for placing the connection in a known status when the status of the connection becomes uncertain.

In the present invention, each of the channels and control units have link-level facilities, each of which is connected by a link to one of the ports of a dynamic switch. Each of the link-level facilities is identified by a link address.

Connection recovery is used by a link-level facility or by a dynamic-switch port to cause the removal of a dynamic connection between its link and any other link, if such a connection exists. Connection recovery uses the interlocked exchanges of the unconditional disconnect (UD) and the unconditional disconnect response (UDR) sequences. Connection recovery is initiated by a link-level facility when there is uncertainty as to the state of a connection in the dynamic switch or by a port when the connection is being abnormally removed without the prior knowledge of one or both of the affected link-level facilities. The purpose of this exchange is to place the switch in a guaranteed disconnected state without interference from another link-level facility which may be trying to connect to one of the two link-level facilities involved in connection recovery.

A link-level facility or dynamic-switch port initiates connection recovery by transmitting the UD sequence. The link-level facility or dynamic-switch port that recognizes the UD sequence responds by transmitting the UDR sequence. When the link-level facility or dynamic-switch port that is transmitting the UD sequence recognizes the UDR sequence, it stops sending the UD sequence and starts transmitting idle characters or a frame and considers recovery complete. When the link-level facility or dynamic-switch port that is transmitting the UDR sequence recognizes a set number of consecutive idle characters or, optionally, start-of-frame reception, it stops sending the UDR sequence and starts transmitting a string of idle characters or a frame.

When the transmission of the UDR sequence is ended and the transmission of the string of idle characters or transmission of a frame is started, the sending link-level facility considers connection recovery to be completed.

Once a link-level facility or dynamic-switch port considers connection recovery to be completed, it is permitted to accept frames and respond to those frames even though a minimum number of idle characters is not yet completely sent. When a frame allows connection recovery to be completed in this manner, that frame may be accepted, and the appropriate response for the conditions present sent.

If a link failure is recognized during these exchanges of sequences, then connection recovery is terminated, and the link failure protocols are observed. If conditions that cause an offline procedure to be initiated are recognized during these exchanges of sequences, connection recovery is terminated, and the offline procedure is performed.

When the connection-recovery procedure is invoked by a port that is dynamically connected to another port, it causes removal of the dynamic connection of the two ports and causes the other port to perform the connection recovery procedure. The connection-recovery procedure will cause removal of the dynamic connection of the two ports and cause the other port to initiate the connection-recovery procedure. When the connection-recovery procedure is invoked to remove a dynamic connection, the two dynamic-switch ports perform the connection-recovery procedure separately, and each port becomes available for new connections when it successfully completes its procedure.

When the UD or UDR sequence is recognized by a port that is in the static pass-through state, the other port transmits the received sequence on that other port's link, to give the appearance of a point-to-point connection. The static connection is not removed, and the transfer of the transmission characters received from the link at one port through the switch connected to the link at the other port is unaffected by connection recovery.

It is therefore an object of the present invention to provide a mechanism to remove a connection between the port of a dynamic switch to which the link-level facility of a channel or a control unit is attached and a second port of a dynamic switch, if such a connection exists, if either the link-level facility or the dynamic-switch port becomes uncertain as to the state of the connection through the dynamic switch.

It is another object of the present invention to provide an interlocked exchange to place a switch in a computer I/O system in a guaranteed disconnected state without interference from another link-level facility which may be trying to connect to one of two link-level facilities involved in connection recovery.

It is another object of the present invention to provide a switch-recovery facility in each of a link-level facility and the ports of a dynamic switch wherein the switch-recovery facility begins sending UDR sequences upon sensing UD sequences.

It is another object of the present invention to provide a switch-recovery facility in each of link-level facility and the ports of a dynamic switch wherein the switch-recovery facility begins sending idle sequences or a frame upon sensing UDR sequences.

It is another object of the present invention to provide a switch-recovery facility in each of the ports of a dynamic switch wherein each port enters a switch-connection recovery state upon the entry into a switch-connection recovery state of a dynamically connected port.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
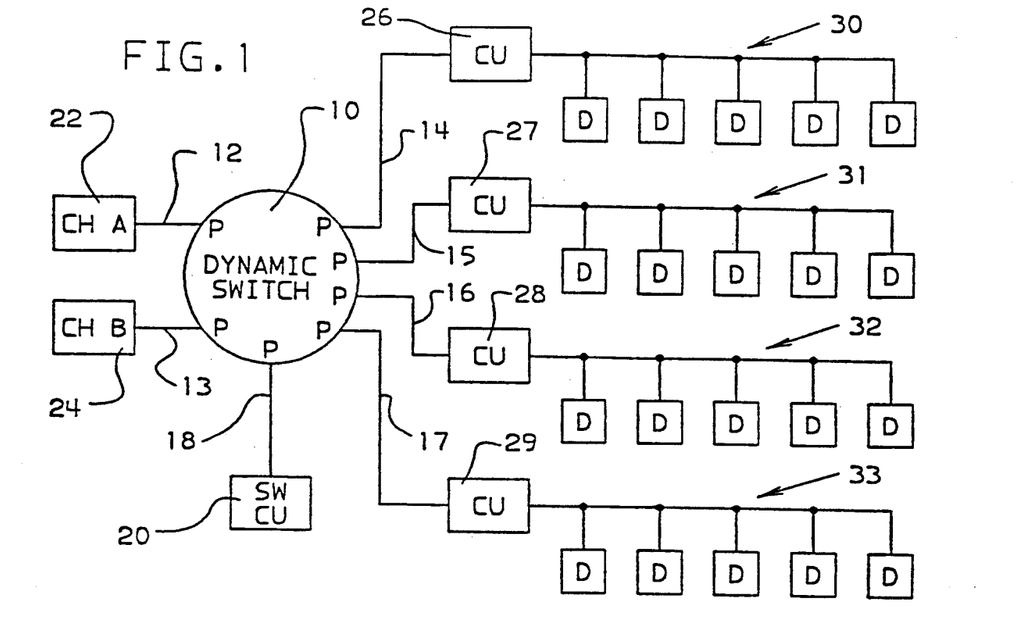
FIG. 1 is a block diagram of an I/O system usable with the present invention, the I/O system having channels connected to control units through a dynamic switch.

FIG. 1 is a block diagram of the I/O system of a data processing system for making dynamic connections between the channel subsystem of the data processing system and control units. The I/O system includes a dynamic switch 10 having a plurality of ports P, each port P attached to one end of a plurality of links 12-18. One of the links 18 is attached to a dynamic-switch control unit 20, and each of the other links 12-17 is attached to either a channel, such as channel A designated 22 or channel B designated 24, or to one of the control units 26-29. Each of the control units 26-29 control a plurality 30-33 of peripheral devices D, respectively.

Each of the channels 22 and 24 is a single interface on a channel subsystem, such as, for instance, an ESA/370 channel subsystem. The channels 22 and 24 direct the transfer of information between I/O devices of the pluralities 30-33 of devices D and main storage (not shown) of the data processing system and provide the common controls for the attachment of different I/O devices D by means of a channel path (to be defined). The channels 22 and 24 are channels wherein data is transmitted and received in a frame, as will be explained.

Each of the links 12-17 is a point-to-point pair of conductors that may physically interconnect a control unit and a channel, a channel and a dynamic switch (such as links 12 and 13), a control unit and a dynamic switch (such as links 14-17), or, in some cases, a dynamic switch and another dynamic switch. The two conductors of a link provide a simultaneous two-way communication path, one conductor for transmitting information in one direction and the other conductor for transmitting information in the other direction. When a link attaches to a channel or a control unit, it is said to be attached to the I/O interface of that channel or control unit. When a link is attached to a dynamic switch, it is said to be attached to a port P on that dynamic switch. When the dynamic switch makes a connection between two dynamic-switch ports, the link attached to one port is considered physically connected to the link attached to the other port, and the equivalent of one continuous link is produced for the duration of the connection.

The dynamic switch 10 provides the capability to physically interconnect any two links that are attached to it. The link attachment point on the dynamic switch 10 is the dynamic-switch port P. Only two dynamic-switch ports P may be interconnected in a single connection, but multiple physical connections may exist simultaneously within the same dynamic switch. The dynamic switch 10 may be constructed as disclosed in U.S. Pat. Nos. 4,605,928; 4,630,045; and 4,635,250. In one preferred embodiment, the dynamic switch 10 is a double sided switch, that is a two-sided cross-point switch, as described in the background of the aforementioned U.S. Pat. No. 4,635,250. The interconnection of two dynamic-switch ports P established by the dynamic switch 10 does not affect the existing interconnection of any other pair of dynamic-switch ports, nor does it affect the ability of the dynamic switch to remove those connections.

When a connection is established, two dynamic-switch ports and their respective point-to-point links are interconnected by a switch matrix within the dynamic switch 10, as explained in the aforementioned switch patents, such that the two links are treated and appear as one continuous link for the duration of the connection. When frames are received by one of two connected switch ports P, the frames are normally passed from one port to the other for transmission on the other port's link.

The dynamic switch 10 can form a connection between two ports P in one of two ways: dynamic or static. The connection is termed a dynamic connection or static connection, accordingly.

The dynamic switch 10 can establish or remove a dynamic connection between two ports P based on the information provided by certain frame delimiters in the serial frames transmitted over the links and based on conditions present at each of these ports P as disclosed in U.S. Pat. No. 5,107,489 issued Apr. 21, 1992 to Brown et al. for "Switch and Its Protocol for Making Dynamic Connections" owned by the assignee of the present invention.

The dynamic switch can establish or remove a static connection between two ports P as a result of commands received by means of the local or remote facilities of the dynamic-switch control unit 20. Frame delimiters or other sequences received at the port P have no effect on the static connection.

When a static connection exists between two ports P, the ports are in the static state. The static state is not affected by any information received from the link or from the statically connected port. If a sequence (to be explained) is received by one of two statically connected ports, the received sequence is normally retransmitted on the connected port's link. Frames may be received and transmitted simultaneously by statically connected ports.

Figure 2:
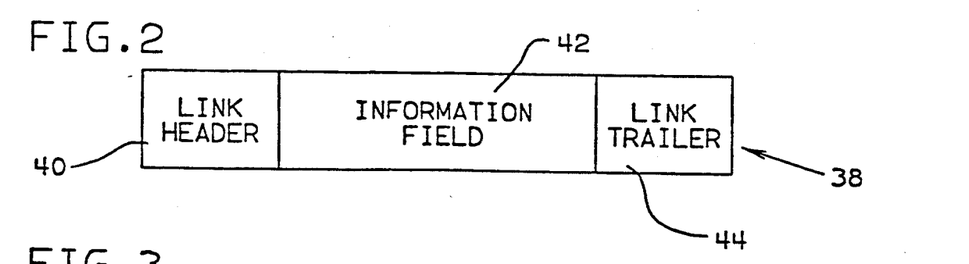
FIG. 2 is a diagrammatic representation of a frame sent over the I/O system of FIG. 1.

As previously mentioned, information is transferred on the serial-I/O interface in a frame. A frame is a unit of information that is sent or received according to a prescribed format. This format delineates the start and end of the unit of information and prescribes the placement of the information within these boundaries. FIG. 2 shows the basic frame format 38 which consists of a fixed-length link-header field 40, a variable-length information field 42, and a fixed-length link-trailer field 44.

Communications using the switch are governed by link-level protocols which provide for making the connection through the dynamic switch 10 and for other control functions. Each channel and each control unit contains a link-level facility, which is the embodiment of the link protocols.

Each link-level facility is assigned a unique address, called the link address. The assignment of a link address to a link-level facility occurs when the link-level facility performs initialization. Every frame sent through the switch contains link-level addressing which identifies the source and destination of the frame. Specifically, this addressing information consists of the link addresses of the sending link-level facility (source link address) and receiving link-level facility (destination link address). The switch uses this addressing information in order to make a connection from the port receiving the frame to the correct port for sending the frame to the specified destination.

Figure 3:
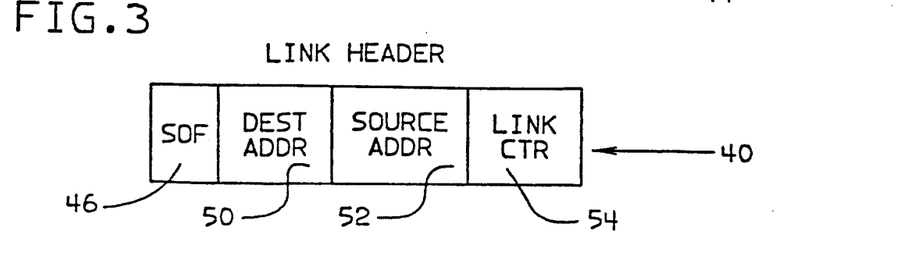
FIG. 3 is a diagrammatic representation of a link header of the frame of FIG. 2.
Figure 4:
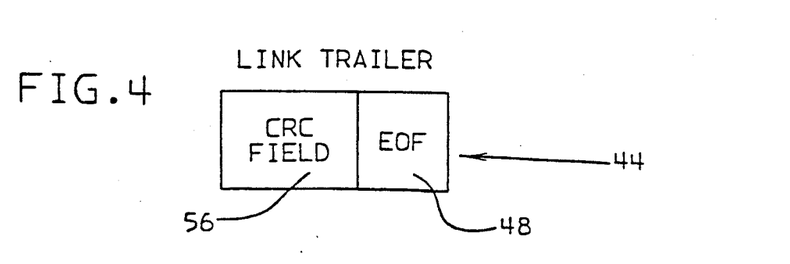
FIG. 4 is a diagrammatic representation of a link trailer of the frame of FIG. 3.

FIG. 3 shows a link header 40, and FIG. 4 shows a link trailer 44. Every frame is bounded by a start-of-frame (SOF) delimiter 46 which is found in the link header 40, and an end-of-frame (EOF) delimiter 48, which is found in the link trailer 44. Frame delimiters 46 and 48 are composed of combinations of special transmission characters which do not have equivalent data codes. In the preferred embodiment, the transmission codes used are those disclosed in U.S. Pat. No. 4,486,739 issued Dec. 4, 1984 to Franaszek et al. for Byte Oriented DC Balanced (0.4) 8B/10B Partitioned Block Transmission Code, owned by the assignee of the present invention. The information contained between the frame delimiters 46 and 48 consist of data characters which have equivalent eight-bit codes as explained in the aforementioned Franaszek et al. patent.

In addition to the SOF 46, the link header 40 of FIG. 3 includes a destination-address field 50, a source-address field 52, and a link-control field 54.

As previously mentioned, the SOF 46 is a special string of transmission characters that cannot appear in the contents of an error-free frame. There are two types of SOF delimiters, the connect-SOF (CSOF) delimiter, which is used as an initiate connection control to initiate the making of a dynamic connection, and passive-SOF (PSOF) delimiter, which causes no action with respect to making a dynamic connection.

The destination-address field 50 is the first field of the contents of a frame and immediately follows the SOF delimiter 46. The destination-address field 50 identifies the link-level facility of a channel or control unit that is the destination for the frame, and is used to route the frame to the link-level facility that is the intended receiver. The destination link address 50 is used to determine which physical connection is to be made, and the destination to which the frame is to be routed through the dynamic switch 10. If no connection exists, that is, if the destination port is in the inactive state, and no busy or port-reject conditions are present, the connection is made and the frame is routed to the destination port.

The source-address field 52 immediately follows the destination address field 50, and identifies the sending link-level facility.

A link-level facility provides its identity as the source of a frame by inserting its assigned link address in the source-address field 52 of any frame that it sends. After a frame is received with a valid source address 52, the source address 52 is used in most cases as the destination address in any subsequent response frame or future request frame to the same link-level facility.

The link-control field 54 indicates the type and format of the frame. The link-control field 54, which is the last field of the link header 40, immediately follows the source-address field 52.

The information field 42 is the first field following the link header 40. The size of the information field depends on the function performed by the particular frame. A reason code, for instance, is transmitted in the information field 42 of response frames.

The link trailer 44 of FIG. 4 includes a cyclic-redundancy-check (CRC) field 56 just before the EOF delimiter 48. The CRC field 56 contains a redundancy-check code that is used by the receiving link-level facility to detect most frame errors which affect the bit integrity of a frame. The address 50 and 52, link-control 54 and information 42 fields are used to generate the CRC 56 and are, therefore, protected by the CRC 56.

The end-of-frame (EOF) delimiter 48 is the last string of transmission characters of a frame. Again, it is a specific sequence of transmission characters that cannot appear in the contents of an error-free frame. When the EOF delimiter 48 is encountered during the reception of a frame, it signals the end of the frame and identifies the two transmission characters immediately preceding the EOF delimiter 48 as the CRC 56 at the end of the contents of the frame. The EOF delimiter 48 also indicates the extent of the frame for purposes of any applicable frame-length checks.

There are two types of EOF delimiters 48, the disconnect-EOF (DEOF) delimiter, which is used to initiate the removal of a dynamic connection, and the passive-EOF (PEOF) delimiter, which causes no action with respect to removing a dynamic connection.

Idle characters are sent over the links when frames are not being transmitted. These idle characters, which are special characters not having data values, are used to maintain the links in synchronism. Sequences of special idle characters are also transmitted to provide limited communication of special control functions such as indications of off-line and malfunction conditions. These sequences of special idle characters may be generated as described in U.S. Pat. No. 5,048,063 issued Sep. 10, 1991 to Gregg et al. for "Transmitting Commands Over a Serial Link", owned by the assignee of the present invention.

The link-level facilities of the control units 26-29 and the channels 22 and 24 each include apparatus for receiving frames and for generating frames. The apparatus for receiving frames may be as described in U.S. Pat. No. 5,025,458 issued Jun. 18, 1991 to Casper et al. copending U.S. application Ser. No. 07/429,257 for "Apparatus for Decoding Frames From a Data Link", and the apparatus for generating frames may be as described in U.S. application Ser. No. 07/428,798 for "Apparatus for Constructing Data Frames for Transmission Over a Data Link", both owned by the assignee of the present invention.

Figure 5:
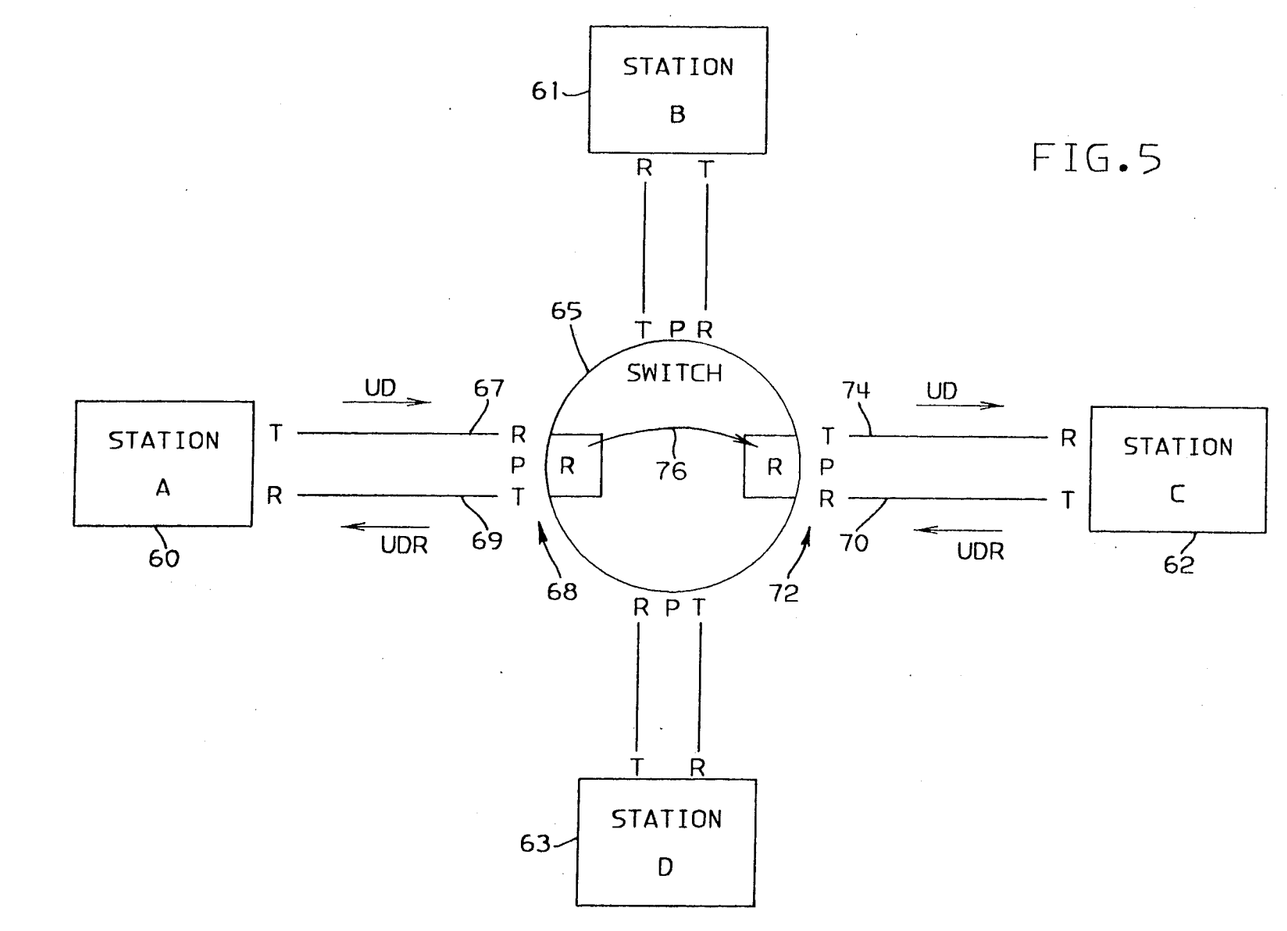
FIG. 5 is a block diagram of a portion of the I/O system of FIG. 1 wherein the channels and control units are represented as stations.

FIG. 5 is a block diagram of a portion of the I/O system of FIG. 1 wherein the link-level facilities 60, 61, 62 and 63 are labeled as station A, station B, station C and station D respectively. It will be understood that the stations 60-63 may be the link-level facilities of either a channel or a control unit, as desired. Each of the stations 60-63 are connected to a dynamic switch 65 by links, as previously described in connection with FIG. 1. As shown in FIG. 5, each link connecting a station to a port P of the dynamic switch 65 is made up of two conductors, one for transmitting signals from the station to the switch, and one for transmitting signals from the switch to the station. For instance, station A 60 is connected to a first conductor 67 for transmitting signals from a transmitter T of station A 60 to a receiver R of the dynamic switch port 68. In the other direction, a second conductor 69 is provided for transmitting signals from a transmitter of dynamic switch port 68 to a receiver R of the station A 60. In the configuration of FIG. 5, a first conductor 70 connects the transmitter T of station C 62 to the receiver R of the dynamic switch port 72. In the other direction, a second conductor 74 provides for the transmission of signals from a transmitter T of the dynamic switch port 72 to a receiver R of station C 62. As explained in the aforementioned patent application "Switch and Its Protocol for Making Dynamic Connections", the dynamic switch 65 repeats those signals received on one port to a connected port, as represented by the blocks labeled R in dynamic switch ports 68 and 72, which in this case are considered connected.

To illustrate how connection recovery of the present invention operates, it will be assumed that station A 60 has become confused as to the state of its connection with station C 62 by the illustrated connection of dynamic switch ports 68 and 72. Thus, station A 60 transmits UD sequences to its switch port 68. When switch port 68 sees the UD sequences, an appropriate disconnect message is sent to switch port 72, for instance, over conductor 76. This disconnect message places the switch port 72 in the connection recovery state. The connection between switch ports 68 and 72 is then broken. Also, when switch port 68 sees the UD sequence, it begins to generate the UDR sequence for transmission over the conductor 69 back to station A 60. When station A 60 sees the UDR sequence after sending the UD sequence, it starts transmitting idle characters over the conductor 67 and goes to an inactive state. When the switch port 68 sees the idle characters from station A 60, it starts transmitting idle characters over conductor 69, goes to the inactive state and considers the connection recovery procedure complete.

Returning to switch port 72, when the switch port 72 enters the connection recovery state, it begins to transmit the UD sequence over conductor 74 to station C 62, when station C 62 sees the UD sequence, it begins to transmit UDR sequence over conductor 70 to switch port 72. When the switch port 72 sees the UDR sequence after sending the UD sequence, it starts transmitting idle characters over conductor 74 and goes to a inactive state. When station C 62 sees idle characters from conductor 74, it begins to send idle characters over conductor 70 and enters the inactive state.

As described in connection with FIG. 5, a link-level facility or a dynamic-switch port performs the connection-recovery procedure when it recognizes the UD sequence.

A link-level facility initiates the connection-recovery procedure when it does not know the state of a connection to which its destination link-level facility is connected (for example, when an expected frame for removing a connection in a dynamic switch is not received), or when certain abnormal conditions are recognized. A dynamic-switch port initiates a connection-recovery procedure whenever it is caused to remove a dynamic connection, other than by recognition of a DEOF delimiter. A dynamic-switch port also initiates the connection-recovery procedure when certain abnormal conditions are recognized that cause the removal of a dynamic connection.

Figure 6:
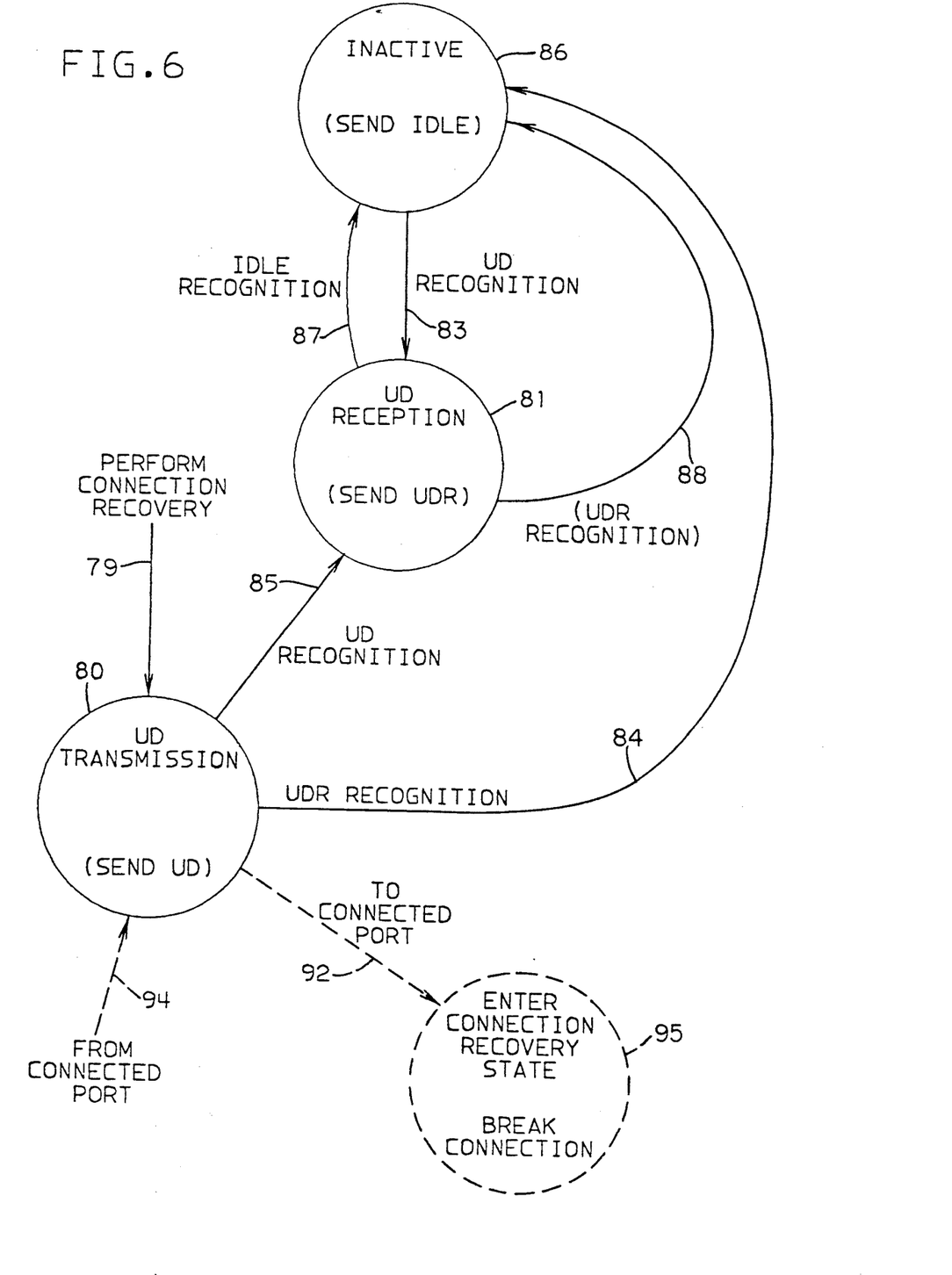
FIG. 6 is a state diagram of the connection recovery state of the switch-connection recovery facility in each of the link-level facilities and dynamic-switch ports of the I/O system of FIG. 1.

FIG. 6 is a diagram of the states of a link-level facility or dynamic-switch port for the connection-recovery procedure. Also shown in phantom in FIG. 6 is the entry into the connection recovery state of a connected dynamic-switch port, if one exists. A link-level facility or dynamic-switch port can be in either one of the two connection-recovery-procedure states. At 80 is shown the UD-transmission state. This state is entered when a link-level facility or a dynamic-switch port initiates transmission of the UD sequence. At 81, is the UD-reception state. This state is entered when the UD sequence is received and recognized by a link-level facility or a dynamic-switch port as shown at 83 and 85.

A link-level facility or a dynamic-switch port does not initiate transmission of the UD sequence while it is in the UD-reception state 81. If a link-level facility or dynamic-switch port has been transmitting the UD sequence and also is ready to transmit the UDR sequence as the result of receiving the UD sequence, and if the UDR sequence is received before the UDR sequence is transmitted, then the link-level facility or port may send idle characters instead of the UDR sequence.

A link-level facility or a dynamic switch port enters the UD transmission state 80 at 79 upon recognition of a condition as previously described which causes the connection-recovery procedure to be started.

When a link-level facility or dynamic-switch port (excluding a dynamic-switch port which is in the static state) is in the UD-transmission state 80, it transmits the UD sequence continuously until one of the following conditions is satisfied:

1. The UDR sequence is received and recognized, causing the link-level facility or dynamic-switch port to enter the inactive state 86 as shown at 84.
2. The UD sequence is received and recognized, causing the link-level facility or dynamic-switch port to enter the UD-reception state 81, as shown at 85.
3. A higher priority condition is recognized, causing the transmitter at the end of the link recognizing the condition to exit the connection-recovery procedure (not shown).

When a link-level facility or dynamic-switch port (excluding a dynamic-switch port which is in the static state) is in the UD-reception state 81, it causes the transmission of the UDR sequence to be initiated. The UDR sequence is transmitted continuously until one of the following conditions is satisfied:

1. A set number of consecutive idle characters are recognized, causing the link-level facility or the dynamic-switch port to start transmission of a series of idle characters, upon which the connection-recovery procedure is considered to be completed by this link-level facility or dynamic-switch port, and the link-level facility or dynamic-switch port enters the inactive state 86 as shown at 87.
2. The UDR sequence is received and recognized, causing the link-level facility or dynamic-switch port to enter the inactive state 86, as shown at 88. This condition is valid only if the UD-reception state 81 had been entered from the UD-transmission state 80.
3. A higher priority condition is recognized, causing the transmitter at the end of the link recognizing the condition to exit the connection-recovery procedure (not shown).

A dynamic-switch port is in the connection-recovery state when the connection-recovery procedure is thus being performed. While a dynamic-switch port is not in the static state and while the port is in the offline-transmission state not interrogating the information received on the link, the port will enter the connection-recovery state when an appropriate condition that causes the connection-recovery procedure occurs, as previously described.

As shown at 92 of FIG. 6, if a port has a dynamic connection with another port when it enters the connection recovery state, the connected port enters the connection recovery state 95 to initiate transmission of the UD sequence, and the connection between the ports is then broken. It will be understood, that once a port enters the connection recovery state 95, it performs the sequence of actions and states beginning with UD-transmission state 80, as previously described. Also, if that other port enters the connection-recovery state, it orders the present port to also enter the connection-recovery state as shown at 94. It will be understood that this may be accomplished by sending an appropriate disconnect message from one port to another, as shown at 76 of FIG. 5. This may be a message over a conductor from one port to another, or it may be accomplished by repeating the UD sequence, if desired.

The connection-recovery state may be entered from any other state except the static state. A dynamic-switch port leaves the connection-recovery state when the connection-recovery procedure is completed or a condition is recognized which causes the port to enter one of the link-failure, offline, or static state. The other states of a link-level facility or a dynamic-switch port are fully explained in U.S. Pat. No. 5,151,977 issued Sep. 29, 1992 to Fredericks et al. for "Managing a Serial Link in a I/O System", owned by the assignee of the present invention.

If another dynamic-switch port receives a request to form a dynamic connection with a port that is in the connection-recovery state, a port-busy frame indicating the destination-port-busy reason code is returned in response to the request.

Even though the UD and UDR commands are described herein as sequences, it will be understood that these commands could be repetitively transmitted in frames with a proper link control code 54, if desired.

Another embodiment includes an additional state which ensures that the link-level facility at one end of a link and the dynamic-switch port at the other end are both transmitting idles before resuming frame transmission.

It will also be understood that this recovery protocol is usable in a point-to-point system where no dynamic switch is present.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by Letters Patent is:

1. A connection recovery apparatus for use in a computer I/O system having a dynamic switch for making a dynamic connection between a pair of dynamic switch ports, each dynamic switch port being attached by a link to a link-level facility, said connection recovery apparatus comprising:

a receiver connected to the link for receiving transmitted messages from the link;

a transmitter connected to the link for transmitting messages over the link;

a UD-transmission state means connected to said transmitter for causing the repetitive transmission of an unconditional disconnect message from said transmitter responsive to an error condition in the dynamic connection of the dynamic switch;

a UD-reception state means connected to said transmitter for causing the repetitive transmission of an unconditional disconnect response message from said transmitter responsive to receiving a UD message at said receiver; and an inactive state means connected to said transmitter indicating said connection recovery is complete, said inactive state for causing the transmission of idle characters from said transmitter responsive to receiving a UDR message at said receiver.

2. The connection-recovery apparatus of claim 1 further comprising:

a port receiver in said UD-transmission state means and connected through the dynamic switch to a second dynamic-switch port, said port receiver for receiving a disconnect message from said connected second dynamic-switch port; and a port transmitter connected to said UD-transmission state means and connected through the dynamic switch to said second dynamic-switch port, said port transmitter for transmitting a disconnect message to said connected second dynamic-switch port responsive to the receipt of the disconnect message by said receiver of said UD transmission state means.

3. The connection-recovery apparatus of claim 2 further comprising:

means connected to said dynamic-switch for breaking the dynamic connection to said connected second dynamic-switch port responsive to the receipt of a disconnect message on said port receiver; and said UD-transmission state means further having means for causing said transmitter to transmit a repetitive UD message over the link responsive to the receipt of said disconnect message on said port receiver.

4. In a data processing I/O system having a switch with a plurality of ports and a plurality of communication stations, each communication station attached to one of said ports, each communication station further having command means for commanding said switch either to make a connection between the communication station's attached one port and a selected other port, or to disconnect the communication station's attached one port with the other port of said switch; a connection recovery apparatus in each communication station, said connection recovery apparatus comprising:

transmitting means having a first message link connected to said one port of said switch, said transmitting means for transmitting data including repetitive commands to said one port of said switch;

receiving means having a second message link connected to said one port of said switch, said receiving means for receiving data including commands from said one port of said switch;

error recognition means connected to said receiving means for recognizing possible connection errors;

unconditional disconnect response recognition means connected to said receiving means for recognizing an unconditional disconnect response command from said attached one port; and command generating means connected to said transmitting means and said error recognition means, said command generating means for causing said transmitting means to transmit a repetitive unconditional disconnect command to said one port to disconnect any connection between said one port and any other port connected by said switch responsive to the detection of a possible error by said error recognition means; and idle character generating means connected to said unconditional disconnect response recognition means and said transmitting means for causing said transmitting means to transmit an idle sequence to said one port responsive to the detection of an unconditional disconnect response command by said unconditional disconnect response recognition means.

5. The connection recovery apparatus of claim 4 further comprising unconditional disconnect recognition means connected to said receiving means for recognizing an unconditional disconnect command from said one port; and wherein said command generating means comprises first means connected to said unconditional disconnect recognition means, said first means for causing said transmitting means to transmit repetitive unconditional disconnect response commands responsive to the recognition of an unconditional disconnect command by said unconditional disconnect recognition means.

6. The connection recovery apparatus of claim 5 wherein each port of said switch comprises:

port transmitting means connected to said second message link for transmitting data including repetitive commands to said receiving means of the attached communication station;

port receiving means connected to said first message link for receiving data including commands from said transmitting means of the attached communication station;

message receiving means dynamically connected through the dynamic switch to said other port, said message receiving means for receiving a disconnect message from said other port;

port unconditional disconnect recognition means connected to said port receiving means, said port unconditional disconnect recognition means for recognizing an unconditional disconnect command from said port receiving means;

disconnect means connected to said unconditional disconnect recognition means and said message receiving means for disconnecting a connection to said other port responsive to either the recognition of an unconditional disconnect command sequence by said unconditional disconnect recognition means or a disconnect message from said message receiving means; and port command generating means connected to said port transmitting means and said port unconditional disconnect recognition means, said port command generating means for causing said port transmitting means to transmit a repetitive unconditional disconnect response command after disconnection by said disconnect means responsive to the recognition of an unconditional disconnect command by said port unconditional disconnect recognition means.

7. The connection recovery apparatus of claim 6 wherein each port of said switch further comprises:

port unconditional disconnect response recognition means connected to said port receiving means for recognizing an unconditional disconnect response command received by said port receiving means;

port idle generating means connected to said port unconditional disconnect response recognition means and said port transmitting means for causing said port transmitting means to transmit an idle sequence responsive to the detection of an unconditional disconnect response command by said port unconditional disconnect response recognition means; and said port command generating means includes second means for causing said transmitting means to transmit repetitive unconditional disconnect commands to said receiving means responsive to a disconnect message from said message receiving means.

8. In a data processing I/O system having a switch with a plurality of ports and a plurality of communication stations, each communication station attached to an individual one of said ports by a link, a switch connection recovery mechanism comprising:

- a command detector in each of said communication stations and each of said ports, the command detector in each communication station being connected to the link to an individual one of said ports, each command detector for detecting an unconditional disconnect (UD) command and an unconditional disconnect response (UDR) command on said link;
- a command generator connected to said command detector in each of said communication stations and each of said ports for generating repetitive UDR commands on said link as long as its connected command detector detects UD commands, and for generating an idle sequence on said link responsive to the detection of a UDR command by said connected command detector; and
- a switch disconnector connected to each of said command detector means in each of said ports for breaking a switch connection from said one port to a second port through said switch upon detection of a UD command by said one port's connected command detector.

9. The connection recovery apparatus of claim 8 wherein each of said communication stations includes an error detector connected to said link, said error detector for detecting possible error conditions in its attached port, and means in its command generator for generating repetitive UD commands responsive to the detection of a possible error by its connected error detector.

10. The connection recovery apparatus of claim 9 wherein each of said ports further includes a receiver dynamically connected through said switch to said second port, said receiver for receiving a disconnect message from said second port before the breaking of a connection by said switch disconnector.

11. The connection recovery apparatus of claim 10 wherein each of said ports include a UD generator in its command generator for generating repetitive UD commands on said link responsive to the receipt of said disconnect message by said receiver.

* * * * *